INVENTOR
John Votypka.
BY Dike, Calvert & Gray
ATTORNEYS.

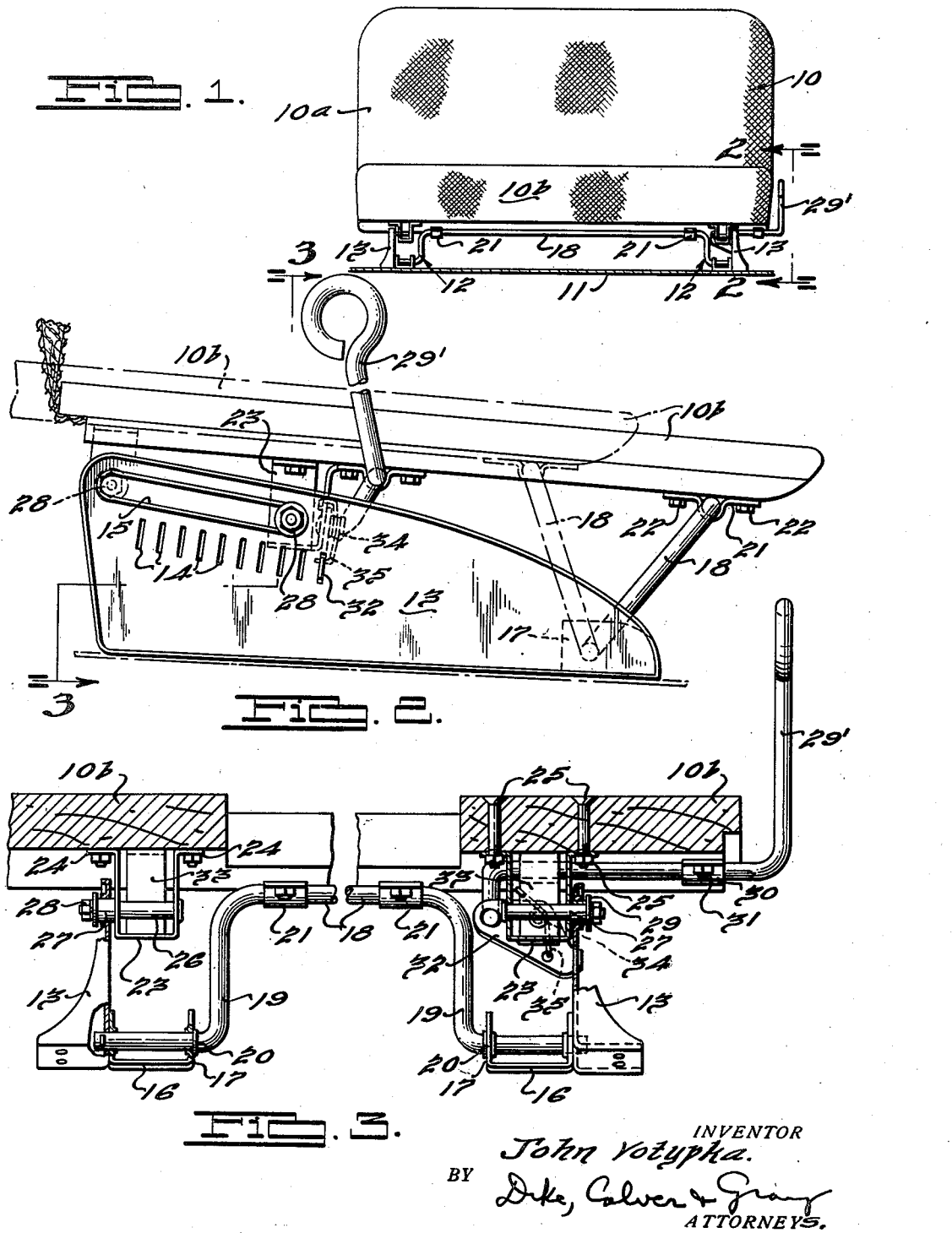

Patented Feb. 10, 1942

2,272,536

UNITED STATES PATENT OFFICE 2,272,536

ADJUSTABLE SEAT

John Votypka, Detroit, Mich., assignor to Briggs Manufacturing Company, Detroit, Mich., a corporation of Michigan Application August 15, 1938, Serial No. 224,877

6 Claims. (Cl. 155—14)

The present invention relates to new and useful improvements in seats for vehicles. More particularly the invention relates to means forming a part of one or more seats in an automobile, especially the seat provided for the operator thereof, which means is adapted to support the seat and at the same time to control the position thereof relative to the vehicle body.

Among the objects of the invention it is proposed to provide an adjustable vehicle seat equipped with mounting and controlling means, which seat while easily moved for adjustment purposes, is simple and durable in construction, reliable and effective in operation, and easy and comparatively inexpensive to manufacture and install.

Another object of the invention is to provide a vehicle seat of the character mentioned which is adapted for a fore and aft sliding movement while at the same time being capable of a substantially vertical tilting movement.

A further object of the invention is to provide a vehicle seat having a mounting and controlling mechanism inclusive of a swingable supporting arm adapted to be fixed to the floor of the vehicle, together with slidable brackets fixed to the seat and adapted for linear movement within openings in appropriate fixed supporting members whereby the said seat is rendered capable of a combined linear and lifting movement.

Still another object of the invention is to provide a vehicle seat possessing the above mentioned structural elements which also has locking means for securing the seat in place when the latter is moved to, or adjusted in a selected position relative to the vehicle body.

Other objects of this invention will appear in the following description and appended claims, reference being had to the accompanying drawings forming a part of this specification wherein like reference characters designate corresponding parts in the several views.

Fig. 1 is a front elevation of one embodiment of the invention when installed upon a supporting surface.

Fig. 2 is a fragmentary longitudinal section of the form of the invention depicted in Fig. 1, taken along the lines 2—2 of Fig. 1 in the direction of the arrows.

Fig. 3 is a fragmentary view in cross section of the form of the invention depicted in Figs. 1 and 2, taken along the lines 3—3 of Fig. 2.

Figure 4:
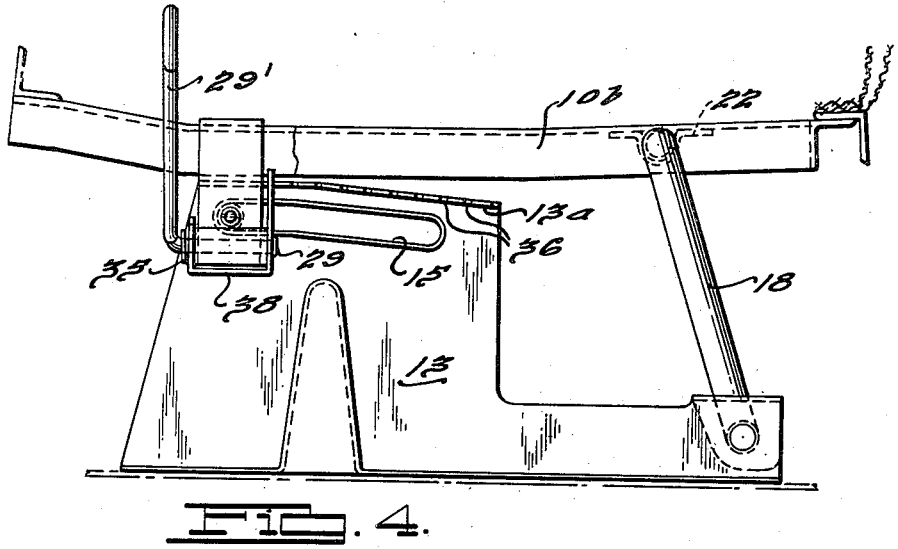
Fig. 4 is a view similar to Fig. 2 but showing one modification of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings, a seat member designated generally by the numeral 10 is there shown installed upon a suitable base or supporting surface 11 which may be the floor of a vehicle or the like. The seat member 10 includes a conventional seat back 10a and seat bottom 10b which for present purposes may be portions of a one-piece structure or may be separately assembled parts; as any conventional vehicle seat portion or member may be utilized as one element of my structure. For example, the forward or driver's seat normally installed within an automobile body is typical of the vehicle seats which may form a part of an embodiment of the invention.

The seat portion 10 is carried by a seat shifting and supporting device which is frame-like in structure and is designated generally by the numeral 12 (Fig. 1). Generally speaking, this frame 12 comprises a pair of supporting beams to which a swingable shaft is pivotally fixed, the said beams also carrying a pair of brackets fixed for sliding movement within slots therein. It follows that the seat 10 is suspended above and supported between the said brackets and shaft, the particular way in which this is accomplished being pointed out in detail hereinafter.

Referring in particular to the supporting frame 12, one form thereof is shown in Figs. 2 and 3 as applied to the seat 10 and together with the latter constitutes a preferred embodiment of the invention. This frame 12 includes a pair of upstanding beam-like plates or supporting members 13, 13 which are longitudinally disposed relative to the seat 10 and are positioned therebeneath and at either side thereof as clearly shown in Fig. 1. The members 13, 13 are generally L-shaped in cross section and possess turned flanges at their lower portions which serve as bases. Suitable openings may be formed in these base portions so that fastening elements (not shown), such as screws, bolts or the like, may be employed to secure the members 13, 13 firmly to the supporting surface 11. Moreover, the members 13, 13 may be shaped to fit an irregular surface 11. For instance, they may slope from the front toward the rear in order to lie flatly against a surface similarly inclined as shown in the drawings. Each of the members 13, 13 possesses a series of parallel vertical slots 14, 14 struck out of, or cut into its side wall. These slots are arranged along a somewhat upwardly inclined axis and are located near the forward portion of the members 13, 13. The said slots are preferably spaced substantially equidistantly from each other in the manner clearly shown in Fig. 2. Near the upper forward corner of each of the members 13, 13 is situated an additional slot 15 which is also upwardly inclined preferably along an axis parallel to the one just mentioned and is positioned over and above the slots 14, 14. The slot 15, however, runs horizontally and is considerably larger than the slots 14, 14, as shown in Fig. 2. It will be noted, however, that the slot 15 is struck from the side walls of the member 13 in such a way that an outwardly extending edge surrounds it and forms a framing marginal flanging thereabout, as particularly depicted in Fig. 3.

The numerals 16, 16 designate a substantially U-shaped bracket which is firmly fixed to the inner lower portion of each of the members 13, 13 as by spot welding, bolting or the like. However, the brackets 16, 16 may be integrally formed from the members 13, 13 if desired. These brackets 16, 16 are provided with registering preferably circular openings 17, 17 in each of their opposing upstanding end walls, the inner one of which may continue through the wall of the member 13 as shown.

The numeral 18 designates a rockshaft which has downwardly and outwardly turned ends, consequently being provided with crank portions at either end as shown at 19, 19 of Fig. 3. The outer extension of these crank portions 19, 19 are inserted within the aligned openings 17, 17 in the brackets 16, 16 and are fixed for rotation therewithin. Any suitable means for so retaining the shaft 18 may be employed, but a boss or annular shoulder 20 positioned at each crank portion as shown constitutes a preferable method, because the shoulder 20 not only prevents any lateral slippage or withdrawing of the shaft 18 but also acts as an escutcheon for movement over the surface of the bracket 16. The shaft 18 is fixed to the underside of the seat portion 10b near its rear extremity. Any means suitable to firmly retain this shaft 18 thereto yet allowing rotation thereof is suitable. However, a preferred fastening means constitutes the rounded brackets or metallic straps 21, 21, the rounded indenture of which snugly fits about the shaft 18 while the flat ears thereof are suitably drilled and are firmly secured to the seat bottom 10b by fastening elements 22, 22, such as screws, bolts or the like.

To the forward end of the seat bottom 10b is fixed a pair of supporting brackets 23, 23, one of which is positioned at either side thereof. These brackets 23, 23 are substantially U-shaped with outwardly turned ears or flanges 24, 24 extending from their open arms. These ears 24, 24 are suitably drilled or apertured so that appropriate fastening elements 25, 25, such as screws, bolts (as shown in Fig. 3) or the like, may be employed to fix the bracket firmly to the underside of the seat bottom 10b with their closed ends projecting downwardly as shown in Fig. 2. The side walls of the brackets 23, 23 possess aligned openings dimensioned to receive a cylindrical pin or bolt 26, the flat head of which forms a shoulder lying against the outer face of the inner wall of the bracket 23. Since these pins 26, 26 are thus inserted in the brackets 23, 23, their respective tips which possess threaded areas extend beyond the outer edges of the brackets 23, 23 and, in fact, continue through the slot 15 in the brace 13 adjacent to which the said bracket 23 is located.

Upon each of the pins 26, 26 is placed a hollow cylindrically shaped roller or bearing 27 which has an annular outwardly turned flange about its outer end. This roller 27 is designed to fit over the pin 26 but is freely rotatable thereupon. In addition, the roller 27 is dimensioned so that, in length, it extends from the flange 23 against which its inner end rests through the slot 15 and slightly therebeyond; and in width, that is, in diameter, is such that it just contacts the inner longitudinal edges of the slot 15 and rests upon the marginal flange thereabout. It will be noted that this roller 27 fits smoothly and rotatably within the slot 15 and is adapted to roll upon the marginal flanging surface mentioned, consequently acting as a bearing. The roller 27 is held in place by means of the nuts 28, 28 and washers 29, 29 which are placed upon the pin 26, the former being threaded thereupon thus serving as a retaining means when tightened up. However, in so tightening the nuts 28, 28 enough play is allowed so that the rollers 27, 27 are freely rotatable.

The numeral 29' depicts a releasing lever arm which is shaped and designed to fit beside the side portion of the seat 10 and extends upwardly, as shown in Fig. 1, for a sufficient distance to be gripped conveniently by an occupant of the seat. To aid such gripping the arm 29' is preferably provided with a handle, such as the looped end indicated in the drawings although any conventional handle may be utilized. This arm 29' is bent approximately at a right angle, as shown, and extends beneath the seat bottom 10b being held thereto by means of a looped bracket 30, which bracket is similar to the brackets 21, 21 previously described. Fastening elements 31, 31, such as bolts or the like, are utilized to retain the bracket 30 securely in place. Near its inner extremity the arm 29' is bent downwardly and forwardly as well in the manner indicated in Fig. 2. This arm 29' terminates within an opening with a lever 32. This lever 32 is generally cam-shaped and is swingable since it is fastened to a supporting plate 33, which plate is fixed at its lower end to the bracket 23 about the under part of which it is bent as shown in Fig. 3 and is fixed at its upper end to the seat bottom 10b. The rivet or pin 34 which extends through suitably pierced and aligned openings in the plate 33 and lever 32 serves as the fastening element for the lever 32 and constitutes the fulcrum about which the latter is swingable. As shown in Fig. 3, the lower end of the lever 32 is blunt in shape and is designed to fit within any one of the slots 14 into which this end portion normally extends.

The numeral 35 indicates a coil spring, the coiled parts of which are wound about the pin 34. One end of this spring 35 is fixed to the lever 32 in any suitable way such, for example, as by soldering, contacting a short lug thereupon or by projecting into a small opening adapted to receive the end of the spring as shown in Fig. 3. The other end of the spring 35 is fixed by similar means to the plate 33 or to some other suitably located base or anchor. It will be appreciated that such a structure makes the lever 32 automatically returnable to its normal position as the spring 35 is subjected to tension when the said lever is placed in any other position.

The operation of my seat supporting and controlling means is as follows: The arm 29' is manually gripped by an occupant of the seat 10 and thrust rearwardly, that is, in the direction of the shaft 18. Such movement of the arm 29' rotates the same within the loop bracket 30 and swings the lever 32 about the pin 33. As a result of such movement the end portion of the lever 32 is removed from the slot 14 into which it normally extends and the spring 35 is placed under tension. The arm 29' is retained in this, its releasing position while the seat 10 is moved to or adjusted in a selected position. The occupant of the seat may so move it by sliding the seat bottom 10b, which is accomplished by the swinging of the shaft 18 about its pivots together with a movement of the brackets 23, 23 within the slots 15, 15. The latter movement takes place as the result of a linear rolling of the bearings 27, 27 within the said slots 15, 15. It will be noted that as the shaft 18 swings it is also elevated somewhat so that the described movement of the seat 10 constitutes a combined linear and tilting movement. When the seat 10 has reached its selected location, the arm 29' is released whereupon the lever 32 will spring into one of the slots 14 and serve to lock the seat in place. The described movement of the seat is indicated by the dotted lines of Fig. 2.

Figure 5:
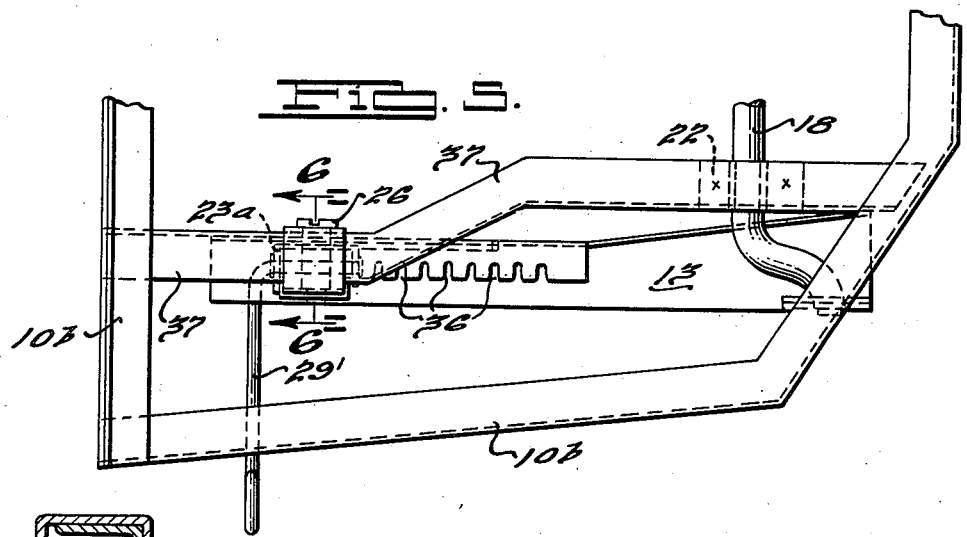
Fig. 5 is a fragmentary plan view of the form of the invention depicted in Fig. 4.
Figure 6:
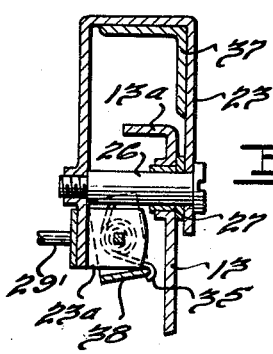
Fig. 6 is a fragmentary and enlarged view of a portion of the embodiment shown in Figs. 4 and 5 and depicts a part of the supporting means utilized therein. It is taken along the lines 6—6 of Fig. 5.

In Figs. 4 to 6 inclusive there is shown another embodiment of the present invention. This modification resembles the preferred form described above, differing therefrom chiefly in the construction of the forward brackets 23, 23 and the location and structure of the locking means. The present modification possesses a pair of supporting braces 13, 13 generally similar to those of the preferred structure. Each of these braces 13, 13 possesses a slot 15 positioned and formed in the way previously described, but carries a series of approximately equidistantly spaced serrations or notches 36, 36 instead of the slots 14, 14. These notches are vertically disposed and are cut into, or formed within a flanging 13a extending outwardly along the forward part of the upper longitudinal edges of the braces 13, 13 as shown in Fig. 5. Except for the alteration mentioned and a somewhat different shape, as depicted in particular in Fig. 4, the braces 13, 13 are constructed and function in a manner entirely comparable to these elements in the form of the invention already described. Likewise the swingable rod 18 and its appurtenant parts and members, especially the brackets 16, 16 and 22, 22 are constructed and operate in the way described in detail above.

Referring especially to Fig. 6, it will be noted, however, that in the present modification the brackets 23, 23 are considerably altered from the structure thereof utilized in the preferred embodiment. In the present modification these brackets, while substantially U-shaped, are installed in an inverted position, that is, the closed end portion of each is fitted adjacent to the seat bottom 10 instead of projecting away therefrom. Moreover, the closed end portion of each of these brackets 23, 23 is fitted over a beam or supporting member 37 which forms a part of the skeleton framework for the seat bottom 10b, and is fixed thereto by suitable fastening means. In addition, the supporting brace 13 extends between the open arms of the bracket 23 instead of being situated adjacent the outer walls thereof as previously described. The brackets 23, 23, however, possess aligned holes in their opposing walls similar to those explained above, within which holes a pin 26 is fixed in a manner entirely comparable to the construction in the form of the invention already described. In will be noted, however, that the bolt 26 may possess a slotted head in the present modification and may be threaded into the outer wall of the bracket 23 instead of being held in place by means of the nut 28. The structure and function of the roller or bearing 27 remains as described previously.

In the present modification the structure and operation of the locking mechanism is considerably altered from that of the preferred structure. It will be noted that the arm 29' is of the same general shape and design and is placed similarly to its position in the preferred embodiment, but it is fixed to an extending portion 23a (Fig. 6) of the bracket 23. This portion 23a is fixed to one of the open arms of the bracket 23 and bends laterally about the lower part of the open end thereof as shown in Fig. 6. This arm 29' contacts a substantially L-shaped lever 38 which functions in place of the cam-shaped lever 32 of the modification described previously. This lever 38 is pivotally hung upon the arm 29' which passes through a pierced opening within its supporting plate 23a and continues between the open arms of the bracket 23 as clearly shown in Fig. 1. It will also be noted that the lever 38 is shaped and positioned to fit beneath and to extend up both open lateral ends of the bracket 23 and is so held by the arm 29' which passes through aligned openings in its upwardly projecting portions. A spring 35 is wound about the arm 29' and contacts the lever 38 as well as being anchored upon the bracket 23 in a manner entirely comparable to the structure of this element in the preferred embodiment of the invention. It will also be noted that the upstanding arm portion of the lever 38 is positioned and adapted to slide along the lateral edge of the flanging 13a and to fit within the notches 36, 36 therewithin and to lock the seat 10 in a selected position as a result.

In operation, the present modification greatly resembles that already described. The seat 10 is swingably suspended between the brackets 23, 23 and the shaft 18 and is adapted to slide forwardly and backwardly by means of a rotation of the said shaft 18 together with a sliding of the brackets 23, 23 within the slots 15, 15 by means of the rollers 27, 27 in a manner entirely like that already described. Moreover, the releasing arm 29' operates in a similar way. This arm 29', however, is thrust laterally away from the seat, consequently, rotating within its supporting portion 23a of the bracket 23 and turning the lever 38 laterally away from the flanging 13a as it does so, so that the upstanding portion thereof is swung away therefrom and is withdrawn from the notches 36, 36. While in this position the locking mechanism releases the seat 10b so that it may be moved to or adjusted in a selected position relative to the braces 13 and consequently to the vehicle body. When in this position the arm 29' is released and the lever 38 returns to its normal locking position, that is, within one of the notches 36, 36.

I claim:

1. An adjustable seat for a vehicle, comprising a pair of fixed supporting braces adapted to be secured to the floor of a vehicle, each of which has an upwardly inclined slot within its upper forward portion, a seat having a laterally extending rod rotatably secured to its underside, which rod is bent downwardly at either end in a crank-like manner, which ends are pivotally connected to said supporting braces; and a pair of movable supporting members carried by the said seat, which members have extensions mounted for sliding and pivotal movement within the aforesaid slots.

2. An adjustable seat for vehicles, comprising a pair of supporting braces adapted to be fixed to the floor of the vehicle, each of which has an upwardly inclined slot within its upper forward part, and a plurality of vertical slots in one of its side walls arranged along an axis parallel to but below the line of inclination of the aforesaid slot; a seat portion having a laterally extending rod rotatably secured to its underside, which rod is bent downwardly at opposite ends in a crank-like manner, which ends are pivotally connected to said supporting braces; and devices carried by said seat portion and mounted for sliding and pivotal movement within said first-named slots, and releasable locking means for the seat cooperable with said vertical slots.

3. An adjustable seat for vehicles, comprising a seat member, a pair of longitudinally disposed supporting braces fixed therebeneath, each of which has a series of vertical slots within its side walls arranged along an upwardly inclined axis; a swingable shaft pivotally fixed at each end to one of the said braces and rotatably fixed to the underside of the said seat member; and supporting member secured to the said seat and mounted for sliding and pivotal movement within forwardly inclined slots in said braces, said seat also carrying a rotatable arm connected to a swingable latching lever adapted to become engaged within any one of the first-named slots, whereby the said seat is capable of adjustment of a position corresponding to any selected slot and of being locked in that selected position.

4. An adjustable seat for a vehicle, comprising a pair of transversely spaced upright supporting members adapted to be secured to the floor of the vehicle, said members having transversely aligned longitudinally extending guide slots within their upper forward portions, a seat, a transversely extending rod having an intermediate portion rotatably secured to the underside of said seat, said rod having downwardly bent crank-like portions terminating in oppositely extending transverse portions journalled in the lower rearward portions of said supporting members, a pair of U-shaped brackets depending from said seat intermediate said supporting members, and a pair of aligned pivot members each supported at spaced points by a bracket, said pivot members connecting said brackets to said supporting members within said guide slots and mounted for sliding and pivotal movement therein.

5. An adjustable seat for a vehicle, comprising a pair of transversely spaced upright supporting members adapted to be secured to the floor of the vehicle, said members having transversely aligned upwardly inclined longitudinally extending guide slots within their upper forward portions, a seat, a transversely extending rod having an intermediate portion rotatably secured to the underside of said seat, said rod having downwardly bent crank-like portions terminating in oppositely extending transverse portions journalled in the lower rearward portions of said supporting members, a pair of brackets depending from said seat intermediate said supporting members, and pivot means connecting said brackets to said supporting members within said guide slots and mounted for sliding and pivotal movement therein.

6. An adjustable seat for a vehicle comprising a pair of transversely spaced upright supporting members adapted to be secured to the floor of the vehicle, said members having transversely aligned longitudinally extending guide slots within their upper forward portions, a seat, a transversely extending rod having an intermediate portion rotatably secured to the underside of said seat, said rod having downwardly bent crank-like portions terminating in oppositely extending transverse portions, generally U-shaped supporting brackets secured to the lower rearward portions of said supporting members and within which each transverse portion of the rod is journalled at laterally spaced points, a pair of U-shaped brackets depending from said seat intermediate said supporting members, and a pair of aligned pivot members each supported at spaced points by a bracket, said pivot members connecting said brackets to said supporting members within said guide slots and mounted for sliding and pivotal movement therein.

JOHN VOTYPKA.